(12) United States Patent
Yamanaka (10) Patent No.: US 7,637,180 B2
(45) Date of Patent: Dec. 29, 2009

(54) PARKING BRAKE APPARATUS

(75) Inventor: Fumikage Yamanaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 512 days.

(21) Appl. No.: 11/506,783

(22) Filed: Aug. 21, 2006

(65) Prior Publication Data
US 2007/0039406 A1    Feb. 22, 2007

(30) Foreign Application Priority Data
Aug. 22, 2005    (JP) .................... P. 2005-239365

(51) Int. Cl.
*G05G 1/04* (2006.01)
*G05G 5/06* (2006.01)
(52) U.S. Cl. .................... 74/523; 74/537
(58) Field of Classification Search ........... 74/523–525, 74/500.5, 501.5 R, 501.6, 519, 537
See application file for complete search history.

(56) References Cited

U.S. PATENT DOCUMENTS 4,212,211 A    7/1980    Rickert
5,159,850 A *  11/1992   Naoi et al. .................... 74/523
5,303,610 A    4/1994    Noel et al.
5,950,496 A    9/1999    Rampp

FOREIGN PATENT DOCUMENTS

DE    20 2004 011 956 U1    11/2004
EP    0 480 108 A1          4/1992
JP    2004-203276 A         7/2004

* cited by examiner

*Primary Examiner*—Thomas R Hannon
*Assistant Examiner*—James Pilkington
(74) *Attorney, Agent, or Firm*—Arent Fox LLP (57) ABSTRACT

A release operation knob is provided at a distal end of a brake operation lever so as to move back and forth in a direction orthogonal to an axis of the brake operation lever. A locking pawl is provided swingably on the brake operation lever so as to engage with ratchet teeth which is fixedly placed on a vehicle body side. A rotational rod is provided so as to rotate on an axis extending substantially along an axial direction of the brake operation lever. The rotational rod includes a primary arm portion and a secondary arm portion are respectively provided on each end of a rod main body. The primary arm portion linked to the release operation knob, and the secondary arm portion is linked to the locking pawl.

16 Claims, 5 Drawing Sheets

FIG. 5B

PARKING BRAKE APPARATUS

The present invention claims foreign priority from Japanese patent application no. 2005-239365, filed on Aug. 22, 2005, the content of which is incorporated herein by reference.

BACKGROUND OF THE INVENTION

1. Field of the Invention

The present invention relates to a parking brake apparatus which operates a brake portion of a vehicle through manual operation when the vehicle is parked.

2. Description of the Related Art

In a parking brake apparatus for a vehicle, a brake operation lever protruding from a vehicle floor is operated to be moved rotationally so as to transmit a braking force to a brake portion (a brake main body) of the vehicle according to a rotated position of the brake operation lever. A proximal portion end of the brake operation lever is connected to the brake portion of the vehicle via a cable, and a rotated position of the brake operation lever can be locked by means of a locking mechanism. In addition, the locking mechanism is constantly biased in a locking direction with a spring, and when releasing a lock of the locking mechanism, a release operation knob at a distal end of the brake operation lever is made to be operated against a biasing force of the spring.

There is such a type of parking brake apparatus in which a driver is places a hand over a distal portion of a brake operation lever so as to cover the distal portion from above, and pushes a release operation knob in with a finger tip in a direction orthogonal to an axis of the brake operation lever (see Japanese Patent Unexamined Publication JP-A-2004-203276).

In this parking brake apparatus, a locking mechanism includes an engaging portion of a sector gear-like shape that is fixedly placed on a vehicle body side, and a locking pawl that is swingably supported at a proximal portion end of the brake operation lever and is engageable with the engaging portion at a distal end portion of thereof. The locking pawl is constantly biased in a direction in which the locking pawl is brought into engagement with the engaging portion with a biasing spring. In addition, an interlocking lever is held on the brake operation lever in such a manner as to move back and forth along an axial direction of the brake operation lever, and a distal end portion of the interlocking lever is interlockably engaged with the locking pawl. Further, a tapered cam surface, which comes into contact with a proximal end portion of the interlocking lever, is formed on a side wall of the release operation knob located inside the brake operation lever. Via the cam surface, a push-in operation force of the release operation knob is transmitted to the interlocking lever.

In this parking brake apparatus having the configuration described above, when the release operation knob is operated to be pushed in from a side of the distal end portion of the brake operation lever, the operation force so applied is transmitted to the locking pawl via the interlocking lever for the locking pawl to be disengaged from the engaging portion, whereby the rotation locking of the brake operation lever is released. Consequently, the driver can operate the brake portion of the vehicle by rotating the brake operation lever in such state.

However, in this parking brake apparatus, since the back and forth movement of the release operation knob in a direction orthogonal to the axis of the brake operation lever is converted into the back and forth movement of the interlocking lever which is substantially orthogonal to that of the release operation knob via a cam mechanism (the cam surface), there is a great friction loss in the cam mechanism, leading to a problem of a low transmission efficiency of operation force.

SUMMARY OF THE INVENTION

It is an object of the present invention to provide a parking brake apparatus having high transmission efficiency of operation force between a release operation knob and a locking pawl without a complex construction, and enhanced operability.

According to a first aspect of the invention, a parking brake apparatus includes:

a brake operation lever (for example, a brake operation lever 1 which will be described in an exemplary embodiment) supported rotatably on a vehicle body, the brake operation lever transmitting an operation force to a brake portion of a vehicle according to a rotated position thereof;

a locking mechanism (for example, a locking mechanism 14 which will be described in the exemplary embodiment) which locks the brake operation lever at an arbitrary rotated position, comprising an engaging portion (for example, a ratchet teeth 8 which will be described in the exemplary embodiment) fixedly placed on the vehicle body side, and a locking pawl (for example, a locking pawl 10 which will be described in the exemplary embodiment) provided swingably on the brake operation lever, wherein an engagement and a disengagement of the locking pawl with respect to the engaging portion are switchable according to a swung position of the locking pawl;

a release operation knob (for example, a release operation knob 16 which will be described in the exemplary embodiment) provided at a distal end of the brake operation lever such that the release operation knob can be operated to move back and forth along a direction orthogonal to an axis (for example, an axis p which will be described in the exemplary embodiment) of the brake operation lever;

a rotational rod (for example, an rotational rod 21 which will be described in the exemplary embodiment) provided on the brake operation lever such that the rotational rod rotate on an axis which extends along the axis of the brake operation lever, wherein the locking pawl is biased by a elastic member (for example, a spring 20 which will be described in the exemplary embodiment) in a direction in which the locking pawl engages with the engaging portion, and the release operation knob and the locking pawl interlock with each other such that a back and forth movement of the release operation knob is converted into a rotational motion of the rotational rod, and the rotational motion of the rotational rod is converted into a swinging movement of the locking pawl.

Accordingly, when the release operation knob is operated to be pushed in from the state where the brake operation lever is locked, the back and forth movement of the release operation knob is converted into the rotational motion of the rotational rod on the axis orthogonal to the direction in which the release operation knob moves back and forth, whereby the rotational motion swings and displaces the locking pawl so as to release the lock of the locking mechanism.

According to a second aspect of the invention, as set for the in the first aspect of the invention, the rotational rod may include:

a rod main body (for example, a rod main body 22 which will be described in the exemplary embodiment) which extends along the axis of the brake operation lever;

a primary arm portion (for example, a primary arm portion 23 which will be described in the exemplary embodiment) which extends radially outward from one end of the rod main body; and a secondary arm portion (for example, a secondary arm portion 24 which will be described in the exemplary embodiment) which extends radially outward from the other end of the rod main body, wherein the primary arm portion is linked to the release operation knob, and the secondary arm portion is linked to the locking pawl.

In such case, when the release operation knob is operated to move back and forth, the release operation knob turns the primary arm portion, whereby the rod main body is rotated in one direction. Then, when the rod main body is rotated in such way, the secondary arm portion turns in the same direction to thereby swing and displace the locking pawl.

According to a third aspect of the invention, as set for the in the second aspect of the invention, the rod main body, the primary arm portion and the secondary arm portion may be formed in a one piece structure.

According to a fourth aspect of the invention, as set for the in the second aspect of the invention, the rod main body, the primary arm portion and the secondary arm portion may be orthogonal to each other.

According to a fifth aspect of the invention, as set for the in the second aspect of the invention, a V-shaped engagement groove (for example, an engagement groove 25 which will be described in the exemplary embodiment) may be formed on the release operation knob into which the rotational rod is inserted in a direction orthogonal to an axis of the release operation knob, wherein the primary arm portion of the rotational rod is engaged with the engagement groove such that a distal end of the primary arm is located on a bottom portion side of the engagement groove, while a root portion end of the primary arm portion is located on an opening side of the engagement groove.

In such case, when the release operation knob is operated to move in the back and forth direction, the distal end of the primary arm portion is displaced together with the bottom portion of the engagement groove. As the same time, the primary arm portion rotates about the axis of the rod main body, and the root portion end of the primary arm portion is prevented from interfering with the release operation knob on the opening side of the engagement groove.

According to a sixth aspect of the invention, as set for the in the first aspect of the invention, a locking load is increased by a contact friction at a meshing portion between the locking pawl and the engaging portion when the brake operation lever is locked, and the contact friction at the meshing portion is reduced when the brake operation lever is pulled slightly upwards from a state in which the brake operation lever is locked, wherein the rotational rod may be formed such that the rotational rod prevents the release operation knob and the locking pawl from interlocking with each other due to a deflection of the rotational rod when the brake operation lever is locked, and such that the rotational rod permits the release operation knob and the locking pawl to interlock with each other when the brake operation lever is pulled slightly upwards from the state in which the brake operation lever is locked.

In such case, when the locking operation of the brake operation lever is completed to result in the state where the locking load is increased by virtue of the contact friction at the meshing portion between the locking pawl and the engaging portion, since the interlocking of the release operation knob with the locking pawl is prevented by virtue of the deflection of the rotational rod even in the event that there occurs a case where the release operation knob is pushed, the engagement between the locking pawl and the engaging portion cannot be released. On the other hand, when the brake operation lever is operated to be pulled slightly upwards from the state where the brake is locked, the contact friction at the meshing portion is reduced, and in the event that the release operation knob is pushed from this state, the engagement between the locking pawl and the engaging portion is released through interlocking between the release operation knob and the locking pawl.

According to a seventh aspect of the invention, as set for the in the first aspect of the invention, the parking brake apparatus may further include:

a rotational piece which is supported rotatably by the brake operation lever; and a pair of parallel guide arms between which the rotational rod is inserted, wherein the rotational piece, the pair of parallel guide arms and the locking pawl are formed in a one piece structure.

According to an eighth aspect of the invention, as set for the in the first aspect of the invention, the elastic member may include a spring.

According to an ninth aspect of the invention, as set for the in the first aspect of the invention, the elastic member may be located so as to be in contact with the release operation knob, and may further bias the release operation knob is biased by the elastic member.

DESCRIPTION OF THE EXEMPLARY EMBODIMENT

Hereinafter, an exemplary embodiment of the invention will be described with reference to the drawings.

Figure 1:
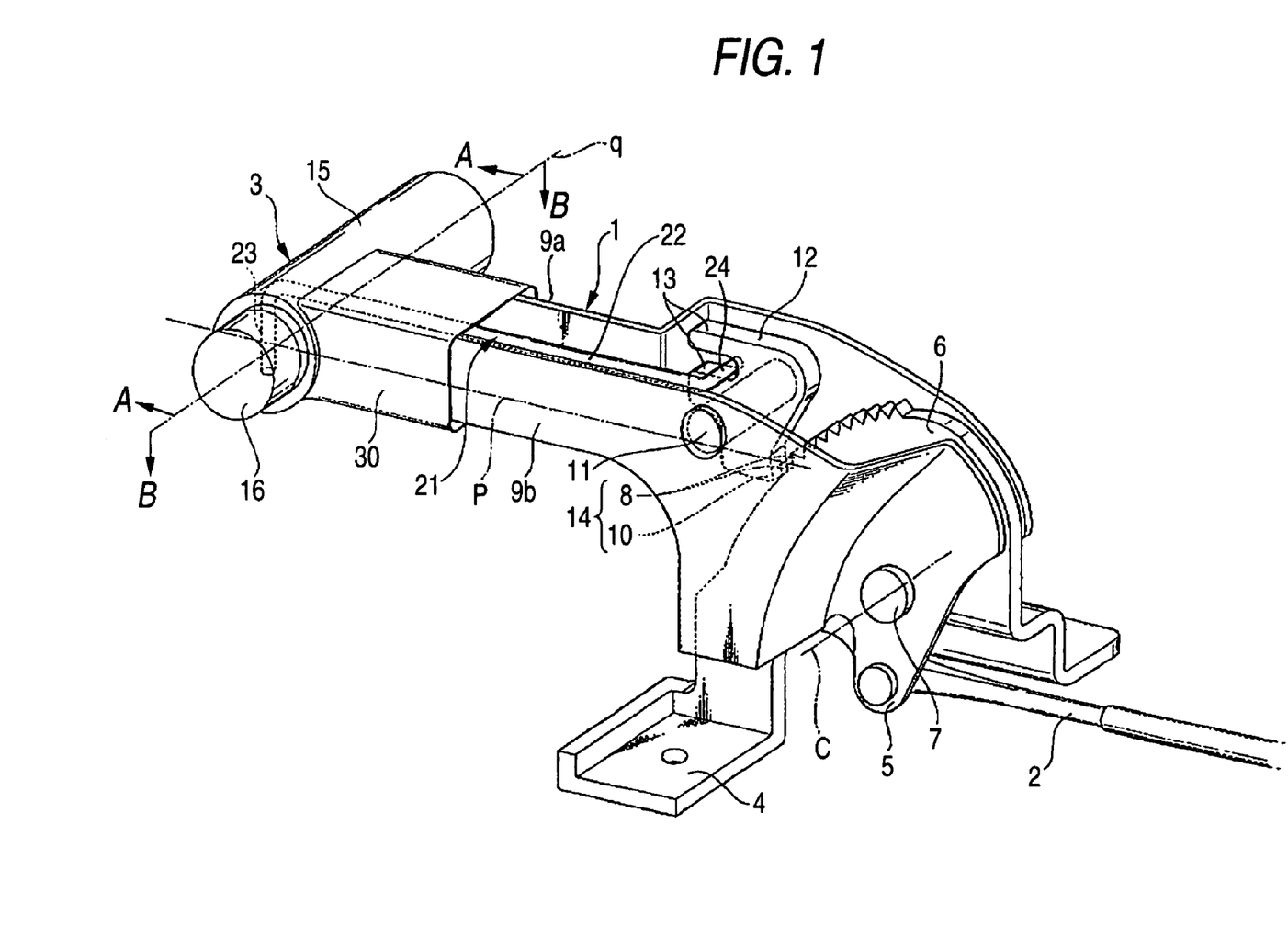
FIG. 1 is a perspective view of a parking brake apparatus according to an exemplary embodiment of the invention with a skin material partially removed.
Figure 2:
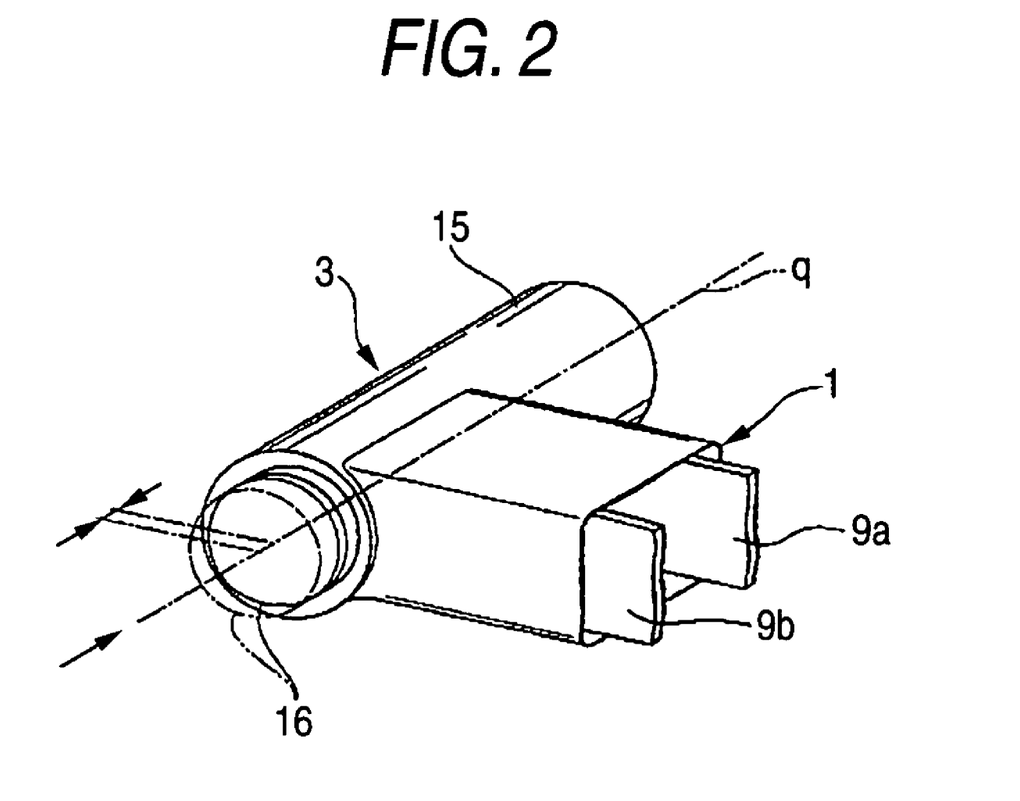
FIG. 2 is a partial perspective view of the parking brake apparatus which shows an operating state of the exemplary embodiment.

FIG. 1 is shows an overall configuration of a parking brake apparatus according to the invention, and in the same figure, reference numeral 1 denotes a brake operation lever in which a pull rod 2 is connected to a proximal end while a grip portion 3 is provided on a distal end thereof, and reference numeral 4 denotes a bracket which rotatably supports the brake operation lever 1 on a vehicle body. One end of the pull rod 2 is connected to a connecting portion 5 which is spaced apart from a rotational center c of the brake operation lever 1, and the other end is connected to a brake device (a brake main body) of a vehicle which is not shown.

The bracket 4 is provide with a support plate portion 6 erecting perpendicularly to a floor surface of a vehicle body along a longitudinal direction of the vehicle body. The brake operation lever 1 is supported rotatably by a shaft member 7 which penetrates through the support plate portion 6. A front upper edge of the support plate portion 6 is formed substantially into an arc shape, and a plurality of ratchet teeth 8 is formed as an engaging portion on the arc portion.

On the other hand, a pair of left and right lever frames 9a, 9b constitute a framework portion of the brake operation lever 1, and is supported on the bracket 4 at a proximal end portion thereof via the shaft member 7. In addition, a locking pawl 10 which meshes with the ratchet teeth 8 is swingably provided at a position facing the ratchet teeth 8 between the lever frames 9a, 9b. The locking paw 10 is formed integrally on a rotational piece 12 which is supported rotatably on both the lever frames 9a, 9b via a shaft member 11. Further, a pair of parallel guide arms 13, 13 is formed integrally on the rotational piece 12 across the shaft member 11 such that the guide arms 13, 13 extend in a direction substantially orthogonal to the locking pawl 10. The locking pawl 10 locks a rotated position of the brake operation lever 10 by meshing with the ratchet teeth 8 which constitute the engaging portion. The locking pawl 10 and the ratchet teeth 8 constitute a locking mechanism 14 of the invention.

Figure 3:
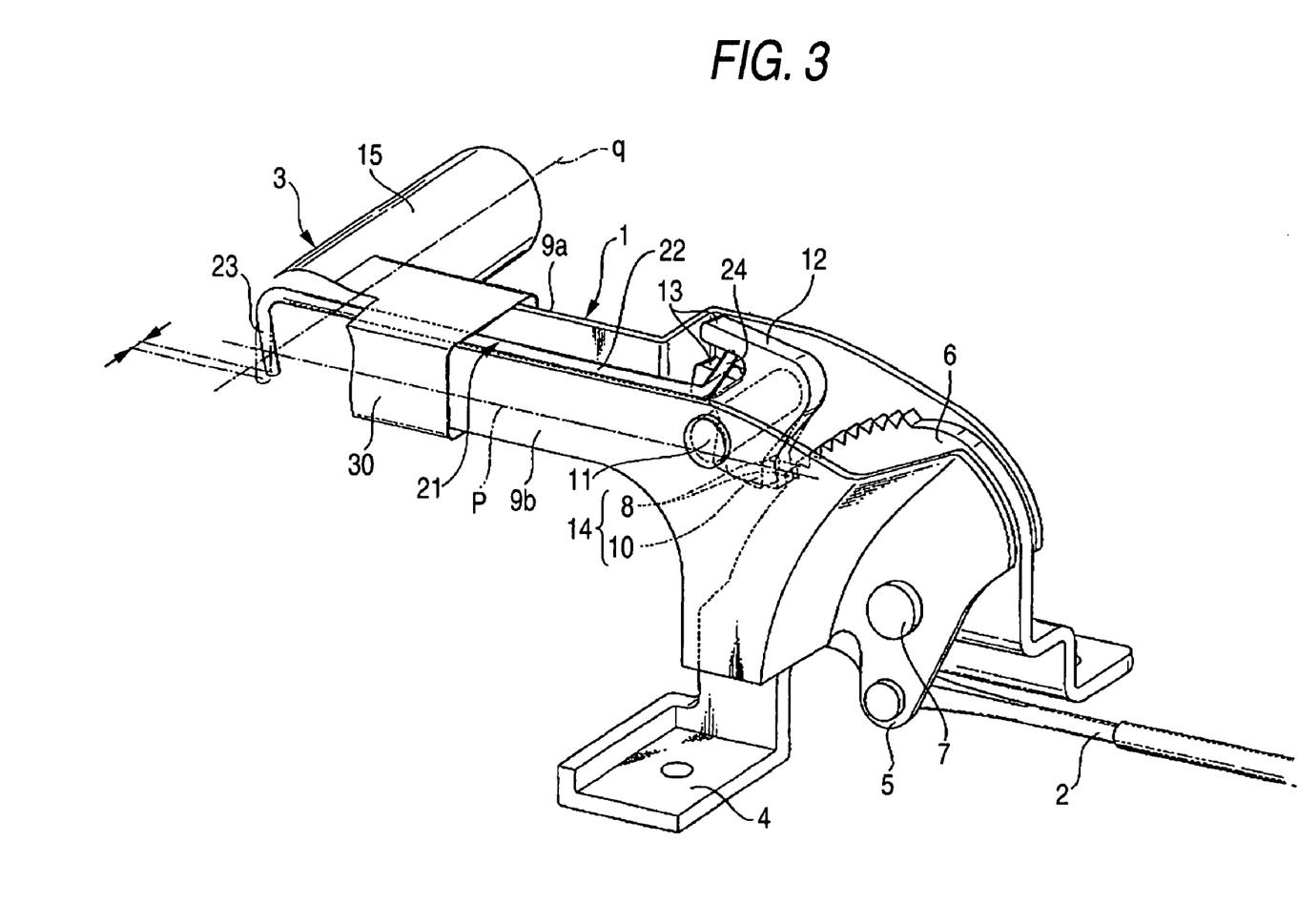
FIG. 3 is a partially cutaway perspective view of the parking brake apparatus with the skin material partially removed, showing the operating state of the exemplary embodiment.

The grip portion 3 at the distal end of the brake operation lever 1 includes, as shown in FIGS. 1 to 5B, a bottomed cylindrical casing 15 which extends in a direction orthogonal to an axis p of the brake operation lever 1 and a release operation knob 16 which is inserted in the casing 15 in such a manner as to move back and forth therein, so that a driver places and covers a hand over the casing portion 15 from above so as to operate the release operation knob 16 to be pushed in from a side thereof with a finger. As shown in FIGS. 4A to 5B, an reception hole 17 is formed on the casing 15 into which the release operation knob 16 is inserted slidably, and a guide hole 18 of a smaller diameter is formed in a center of a bottom portion of the reception hole 17. A guide projection 19 which is provided on a proximal end portion of the release operation knob 16 in such a manner as to project therefrom is inserted into the guide hole 18, so that the loosening of the release operation knob 16 is suppressed by guiding functions of the guide hole 18 and the guide projection 19. In addition, an axis q of the release operation knob 16 which moves back and forth along the guide hole 18 is orthogonal to the axis p of the brake operation lever 1 as shown in FIGS. 1 and 3. Additionally, a return spring 20 is interposed between an end face of a main body portion of the release operation knob 16 and a bottom wall of the reception hole 17 so as to bias the release operation knob 16 in a direction in which the release operation knob 16 projects outward in an axial direction thereof.

As shown in FIGS. 1 and 3, the release operation knob 16 and the rotational piece 12 are linked via a rotational rod 21 which rotates about an axis which extends substantially along the axis p of the brake operation lever 1. The rotational rod 21 is formed of a metallic rod having a circular cross section, and includes a rod main body 22 extending substantially along the axis p of the brake operation lever 1, a primary arm portion 23 extending from one end portion of the rod main body 22, and a secondary arm portion 24 extending from the other end portion of the rod main body 22. The primary arm portion 23 and the secondary arm portion 22 are bent at substantially orthogonal to an axis of the rod main body 22, and the arm portions 23, 24 are directed in directions which are shifted from each other substantially by 90° about the axis of the rod main body 22. In addition, as shown in FIGS. 4A to 5B, one end portion of the rotational rod 21 projects into an interior of the casing 15 of the grip portion 3, and is inserted into an engaged groove 25 formed in an outer circumferential wall of the release operation knob 16 from a direction which is substantially orthogonal to the release operation knob 16.

More specifically, the engagement groove 25 is formed in the outer circumferential wall of the release operation knob 16 such that an axial cross section of the knob 16 has substantially a V shape as a whole, including a pair of tapered surfaces 26a, 26b which form opening edges of the V shape, respectively, and a channel portion 27 which forms a bottom portion of the V shape. The V-like cross section of the engagement groove 25 terminates from one radial end of the release operation knob 16 to a position which slightly exceeds the axial center q, where an end wall 28 extending in the axial direction of the release operation knob 16 is formed.

Figure 4A:
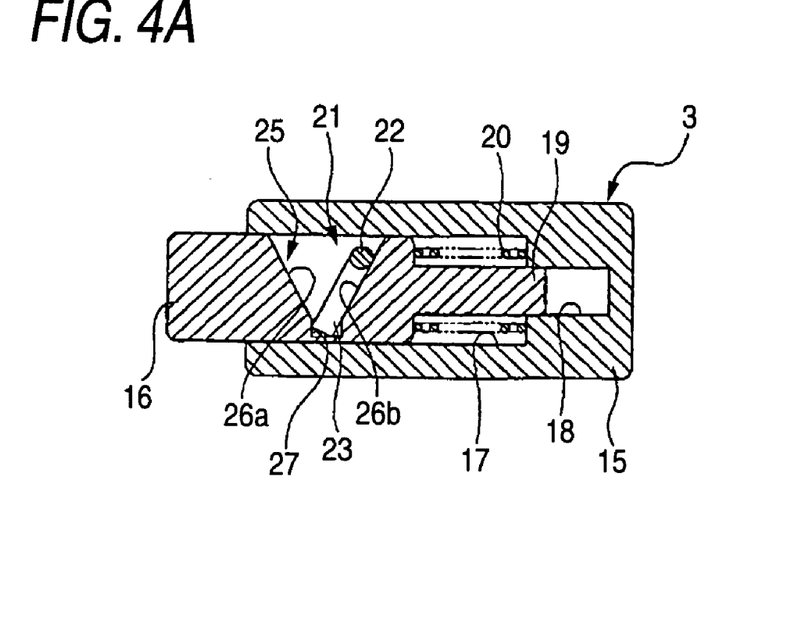
FIG. 4A is a sectional view corresponding to an A-A cross section in FIG. 1.
Figure 4B:
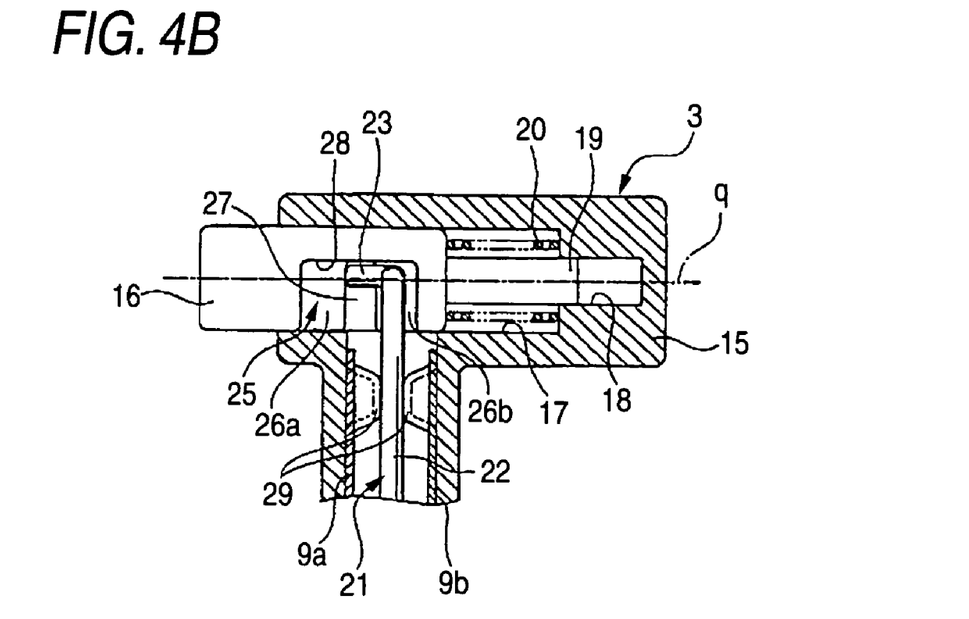
FIG. 4B is a sectional view corresponding to a B-B cross section in FIG. 1.
Figure 5A:
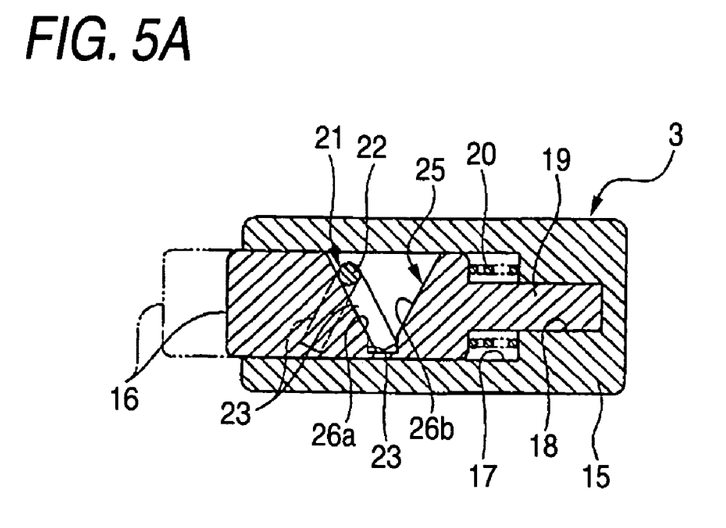
FIG. 5A is a sectional view corresponding to the A-A cross section in FIG. 1 in an operating state.
Figure 5B:
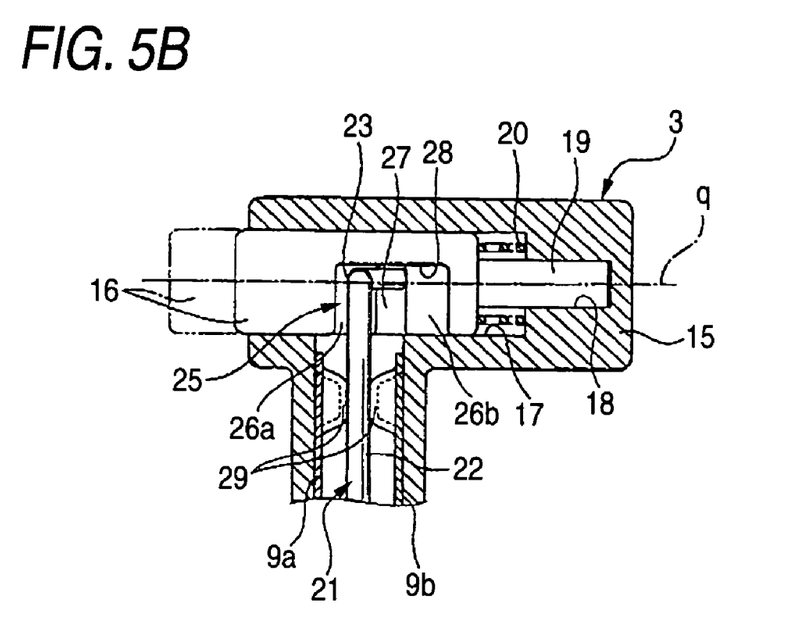
FIG. 5B is a sectional view corresponding to the B-B cross section in FIG. 1 in the operating state.

As shown in FIGS. 4B and 5B, the rod main body 22 of the rotational rod 21 is rotatably held with a pair of guide projections 29, 29, projecting from the lever frames 9a, 9b, respectively. Further, a distal end of the primary arm portion 23 is located within the channel portion 27 on a bottom portion side of the engagement groove 25 while a root portion end (on the rod main body 22 side) is located between the tapered surfaces 26a, 26b. Here, since the rod main body 22 is constantly held in a predetermined position, when the release operation knob 16 moves back and forth, as shown in FIGS. 4A and 5A, the distal end of the primary arm portion 23 is displaced to follow the release operation knob 16. When the distal end of the primary arm portion 23 turns in such way, the back and forth movement of the release operation knob 16 is converted into a rotational motion of the rod main body 22.

On the other hand, the secondary arm portion 24 at the other end of the rotational rod 21 is slidably inserted and engaged between the pair of guide arms 13, 13 of the rotational piece 12. The secondary arm portion 24 is oriented substantially in a horizontal direction in an initial state where the release operation arm 16 is not operated to be pushed in. When the release operation arm 16 is operated to be pushed in from the initial state, the secondary arm portion 24 turns to an upper side so as to rotate the rotational piece 12 via the guide arms 13, 13. Further, the biasing force of the return spring 20 of the release operation knob 16 acts on the rotational rod 21 in a direction in which the secondary arm portion 24 is pushed downwards, so as to bring the locking pawl 10 into mesh engagement with the ratchet teeth 8. In addition, while the locking pawl 10 locks a forward and downward rotation of the brake operation lever 1, when pulling to raise the brake operation lever 1 upwards, the operation of the brake operation lever 1 is permitted through the sliding of the locking pawl 10 over the ratchet teeth 8. Additionally, since the secondary arm portion 24 is oriented substantially in the horizontal direction in its initial state, the rotational piece 12 engaging with a distal end of the secondary arm portion 24 is offset sideways (in a horizontal direction) with respect to the axis of the rod main body 22, and the ratchet teeth 8 (the support plate portion 6) meshing with the locking pawl 10 of the rotational piece 12 are also offset sideways with respect to the axis of the rod main body 22.

By the way, the periphery of the lever frames 9a, 9b of the brake operation lever 1 is covered with a skin material 30 such as resin although it is partially cut away in FIGS. 1 and 3.

In the configuration that has been described heretofore, when applying a parking brake from the brake released state shown in FIG. 1, a driver grips on the grip portion 3 of the brake operation lever 1 and pulls it straight in an upward direction. When the distal end of the brake operation lever 1 is pulled upwards in this way, the locking pawl 10 slides over the ratchet teeth 8, and an operation force according to a rotational angle of the brake operation lever 1 is transmitted to the brake portion of the vehicle via the pull rod 2. Then, when the driver loosens the rotating operation force, the locking pawl 10 receives the force of the return spring 20 engages with the ratchet teeth 8, where the rotation of the brake operation lever 1 is locked.

When releasing the parking brake from the locking state, the driver grips on the grip portion 3 on the brake operation lever 1 and pushes the release operation lever 16 in from the side (see FIG. 2) with a finger while pulling the brake operation lever 1 slightly upwards. As this time, the release operation knob 16 enters the reception hole 17 against the force of the spring 20 as shown in FIGS. 5A and 5B from the state shown in FIGS. 4A and 4B, and the primary arm portion 23 of the rotational rod 21 turns towards a bottom portion side of the reception hole 17 according to the displacement of the channel portion 27. Thus, when the primary arm portion 23 turns, the rod main body 22 of the rotational rod 21 rotates in the same direction, and the secondary arm portion 24 turns to be displaced in the same direction following the rotation of the rod main body 22. At this time, since the secondary arm portion 24 is oriented substantially in the horizontal direction in its initial state, a distal end portion of the secondary arm portion 24 turns upwards as shown in FIG. 3, whereby the guide arms 13, 13 of the rotational piece 12 engaging with the secondary arm portion 24 are pulled upwards. The rotational piece 12 is caused to rotate by the upward movement of the guide arms 13, 13, and the locking pawl 10 meshes with the ratchet teeth 8 is then moved apart from the ratchet teeth 8, whereby the locking of the brake operation lever 1 by the locking mechanism 14 is released, and a rotational operation of the brake operation lever 1 for brake release is permitted.

Note that pulling the brake operation lever 1 slightly upwards when releasing the brake is intended to reduce the contact friction (meshing friction) between the locking pawl 10 and the ratchet teeth 8. In addition, the rotational rod 21 is made to permit the interlocking between the release operation knob 16 and the locking pawl 10 only when the locking load is reduced by pulling the brake operation lever 1 slightly upwards. When the brake operation lever 1 is not pulled upwards, the interlocking between the release operation knob 16 and the locking pawl 10 is prevented due to the deflection of the rotational rod 21.

In the parking brake apparatus according to the exemplary embodiment, that the back and forth movement of the release operation knob 16 which is substantially orthogonal to the brake operation lever 1 is converted into the rotation of the rotational rod 21 extending substantially along the axial direction of the brake operation lever 1, and the rotation of the rotational rod 21 is further converted into the rotational motion of the rotational piece 12 so as to be transmitted to the locking pawl 10. Therefore, the transmission of operation force from the release operation knob 16 to the locking pawl 10 can be ensured without using a complex guiding construction. Further, an increase in friction is suppressed. Consequently, by adopting the parking brake apparatus according to the exemplary embodiment, the production costs can be reduced due to the simplified construction, and operability can be increased due to the reduction in friction.

Further, in the parking brake apparatus according to the exemplary embodiment, since the primary arm portion 23 and the secondary arm portion 24 are formed by bending the respective end portions of the rod main body 22, the interlocking between the release operation knob 16 and the locking pawl 10 can be ensured only by engaging the primary arm portion 23 with the release operation knob 16, and engaging the secondary arm portion 24 with the rotational piece 12. Consequently, since the ensured interlocking between the interlocking between the release operation knob 16 and the locking pawl 10 can be realized without adding a number of components, a further reduction in production costs can be realized.

Furthermore, in the parking brake apparatus according to the exemplary embodiment, since the engagement groove 25 is formed substantially in a V-shape on the release operation knob 16, and one end of the rotational rod 21 is inserted into the engagement groove 25 from the direction substantially orthogonal thereto such that the distal end portion of the primary arm portion 23 is located on the bottom portion side of the engagement groove 25 while the root end of the primary arm portion 23 is located on the opening side of the engagement groove 25, the back and forth movement of the release operation knob 16 can be surely converted into the rotational motion of the rod main body 22. On top of this, the assembling work can be facilitated, and once assembled together, the release operation knob 16 can be surely prevented from being pulled out or dropped out due to the rotational rod 21. Namely, when assembling the rotational rod 21 to the release operation knob 16, only by aligning the primary arm portion 23 to a predetermined orientation with respect to the engagement groove 25 and pushing in the rod main body 22 of the rotational rod 21 in the axial direction, the interlocking between the release operation knob 16 and the rotational rod 21 can be attained. In addition, after the rotational rod 21 has once been assembled to the release operation knob 16, since the rod main body 22 projects into the interior of the engagement groove 25, the release operation knob 16 can be surely prevented from being pulled out or dropped out as long as the rotational rod 21 is moved backward therefrom.

Furthermore, according to the exemplary embodiment, the release operation knob 16 and the rotational rod 21 constantly interlock with each other via the engagement groove 25 and the primary arm portion 23, and the rotational rod 21 and the locking pawl 10 also constantly interlock with each other via the secondary arm portion 24 and the guide arms 13, 13. Therefore, the return spring 20 of the release operation knob 16 can also be used as a biasing device for biasing the locking pawl 10 in the direction in which the locking pawl 10 is brought into mesh engagement with the ratchet teeth 8. Consequently, by adopting the parking brake apparatus according to the exemplary embodiment, the number of springs to be placed can be reduced so as to reduce, in turn, the number of components to be used. In addition, since the assembling of the return spring 20 of the release operation knob 16 can be completed by inserting the return spring 20 into the reception hole 17 in the casing 15 together with the release operation knob 16 and inserting the end portion of the rotational rod 21 in the engagement groove 25 of the release operation knob 16, it is also advantageous in that the assembling workability is enhanced.

Furthermore, in the parking brake apparatus according to the exemplary embodiment, upon releasing the brake from the locked state, since the interlocking between the release operation knob 16 and the locking pawl 10 is prevented due to the deflection of the rotational rod 21 as long as the release operation knob 16 is not pushed in with the brake operation lever 1 being pulled slightly upwards, a lock release of the brake due to an erroneous push-in operation of the release operation knob 16 can be surely prevented.

The invention is not limited to the exemplary embodiments that has been described heretofore, and hence, various design changes or modifications can be made thereto without departing from the spirit and scope of the invention. For example, while in the aforesaid exemplary embodiment, the brake operation lever is linked to the brake device of the vehicle by utilizing the pull rod, the brake operation lever and the brake device of the vehicle may be linked to each other via a brake wire without using the pull rod.

While there has been described in connection with the exemplary embodiment of the present invention, it will be obvious to those skilled in the art that various changes and modification may be made therein without departing from the present invention. It is aimed, therefore, to cover in the appended claim all such changes and modifications as fall within the true spirit and scope of the present invention.

What is claimed is:

1. A parking brake apparatus comprising:
    a brake operation lever supported rotatably on a vehicle body, the brake operation lever transmitting an operation force to a brake portion of a vehicle according to a rotated position thereof;
    a locking mechanism which locks the brake operation lever at an arbitrary rotated position, comprising
        an engaging portion fixedly placed on the vehicle body side, and
        a locking pawl provided swingably on the brake operation lever, wherein an engagement and a disengagement of the locking pawl with respect to the engaging portion are switchable according to a swung position of the locking pawl;
    a release operation knob provided at a distal end of the brake operation lever, wherein the release operation knob moves back and forth along a direction orthogonal relative to a longitudinal axis of the brake operation lever; and
    a rotational rod provided on the brake operation lever, wherein the rotational rod rotates about an axis which extends along the longitudinal axis of the brake operation lever,
    wherein the locking pawl is biased by a elastic member in a direction in which the locking pawl engages with the engaging portion, and
    the release operation knob and the locking pawl interlock with each other, wherein the back and forth movement of the release operation knob is converted into the rotational motion of the rotational rod, and the rotational motion of the rotational rod is converted into a swinging movement of the locking pawl.

2. The parking brake apparatus as set forth in claim 1, wherein the rotational rod comprises:
    a rod main body which extends along the longitudinal axis of the brake operation lever;
    a primary arm portion which extends radially outward from one end of the rod main body; and
    a secondary arm portion which extends radially outward from the other end of the rod main body,
    wherein the primary arm portion is linked to the release operation knob, and
    the secondary arm portion is linked to the locking pawl.

3. The parking brake apparatus as set forth in claim 2, wherein the rod main body, the primary arm portion and the secondary arm portion are formed in a one-piece structure.

4. The parking brake apparatus as set forth in claim 2, wherein the rod main body, the primary arm portion and the secondary arm portion are orthogonal to each other.

5. The parking brake apparatus as set forth in claim 2, wherein a V-shaped engagement groove is formed on the release operation knob into which the rotational rod is inserted in a direction orthogonal to an axis of the release operation knob,
    further wherein the primary arm portion of the rotational rod is engaged with the engagement groove such that a distal end of the primary arm is located on a bottom portion side of the engagement groove, while a root portion end of the primary arm portion is located on an opening side of the engagement groove.

6. The parking brake apparatus as set forth in claim 1, wherein a locking load is increased by a contact friction at a meshing portion between the locking pawl and the engaging portion when the brake operation lever is locked, and
    the contact friction at the meshing portion is reduced when the brake operation lever is pulled slightly upwards from a state in which the brake operation lever is locked,
    further wherein the rotational rod is formed such that the rotational rod prevents the release operation knob and the locking pawl from interlocking with each other due to a deflection of the rotational rod when the brake operation lever is locked, and such that the rotational rod permits the release operation knob and the locking pawl to interlock with each other when the brake operation lever is pulled slightly upwards from the state in which the brake operation lever is locked.

7. The parking brake apparatus as set forth in claim 1, wherein the elastic member includes a spring.

8. The parking brake apparatus as set forth in claim 1, wherein the elastic member is located so as to be in contact with the release operation knob, and further biases the release operation knob.

9. A parking brake apparatus comprising:
    a brake operation lever supported rotatably on a vehicle body, the brake operation lever transmitting an operation force to a brake portion of a vehicle according to a rotated position thereof;
    a locking mechanism which locks the brake operation lever at an arbitrary rotated position, comprising
        an engaging portion fixedly placed on the vehicle body side, and
        a locking pawl provided swingably on the brake operation lever, wherein an engagement and a disengagement of the locking pawl with respect to the engaging portion are switchable according to a swung position of the locking pawl;
    a release operation knob provided at a distal end of the brake operation lever, wherein the release operation knob moves back and forth along a direction orthogonal relative to a longitudinal axis of the brake operation lever;
    a rotational rod provided on the brake operation lever, wherein the rotational rod rotates about an axis which extends along the longitudinal axis of the brake operation lever,
    wherein the locking pawl is biased by an elastic member in a direction in which the locking pawl engages with the engaging portion, the release operation knob and the locking pawl interlock with each other such that the back and forth movement of the release operation knob is converted into the rotational motion of the rotational rod, and the rotational motion of the rotational rod is converted into a swinging movement of the locking pawl,
    a rotational piece which is supported rotatably by the brake operation lever; and
    a pair of parallel guide arms between which the rotational rod is inserted, wherein the rotational piece, the pair of parallel guide arms and the locking pawl are formed in a one-piece structure.

10. The parking brake apparatus as set forth in claim 9, wherein the rotational rod comprises:
a rod main body which extends along the longitudinal axis of the brake operation lever;
a primary arm portion which extends radially outward from one end of the rod main body; and
a secondary arm portion which extends radially outward from the other end of the rod main body,
wherein the primary arm portion is linked to the release operation knob, and
the secondary arm portion is linked to the locking pawl.

11. The parking brake apparatus as set forth in claim 10, wherein the rod main body, the primary arm portion and the secondary arm portion are formed in a one-piece structure.

12. The parking brake apparatus as set forth in claim 10, wherein the rod main body, the primary arm portion and the secondary arm portion are orthogonal to each other.

13. The parking brake apparatus as set forth in claim 10, wherein a V-shaped engagement groove is formed on the release operation knob into which the rotational rod is inserted in a direction orthogonal to an axis of the release operation knob,
further wherein the primary arm portion of the rotational rod is engaged with the engagement groove such that a distal end of the primary arm is located on a bottom portion side of the engagement groove, while a root portion end of the primary arm portion is located on an opening side of the engagement groove.

14. The parking brake apparatus as set forth in claim 9, wherein a locking load is increased by a contact friction at a meshing portion between the locking pawl and the engaging portion when the brake operation lever is locked, and
the contact friction at the meshing portion is reduced when the brake operation lever is pulled slightly upwards from a state in which the brake operation lever is locked,
further wherein the rotational rod is formed such that the rotational rod prevents the release operation knob and the locking pawl from interlocking with each other due to a deflection of the rotational rod when the brake operation lever is locked, and such that the rotational rod permits the release operation knob and the locking pawl to interlock with each other when the brake operation lever is pulled slightly upwards from the state in which the brake operation lever is locked.

15. The parking brake apparatus as set forth in claim 9, wherein the elastic member includes a spring.

16. The parking brake apparatus as set forth in claim 9, wherein the elastic member is located so as to be in contact with the release operation knob, and further biases the release operation knob.

* * * * *

UNITED STATES PATENT AND TRADEMARK OFFICE
CERTIFICATE OF CORRECTION

| | | |
|---|---|---|
| PATENT NO. | : 7,637,180 B2 | Page 1 of 1 |
| APPLICATION NO. | : 11/506783 | |
| DATED | : December 29, 2009 | |
| INVENTOR(S) | : Fumikage Yamanaka | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 642 days.

Signed and Sealed this

Ninth Day of November, 2010

David J. Kappos
*Director of the United States Patent and Trademark Office*